(12) United States Patent
Watanabe et al.

(10) Patent No.: US 6,502,829 B2
(45) Date of Patent: Jan. 7, 2003

(54) GASKET-SQUEEZE CONSTRUCTION

(75) Inventors: Takuya Watanabe, Osaka (JP); Kiyoshi Sugimoto, Osaka (JP); Kazuya Yoshijima, Aichi-ken (JP)

(73) Assignee: Nippon Gasket Co., Ltd. (JP)

( * ) Notice: Subject to any disclaimer, the term of this patent is extended or adjusted under 35 U.S.C. 154(b) by 0 days.

(21) Appl. No.: 09/799,695

(22) Filed: Mar. 7, 2001

(65) Prior Publication Data

US 2001/0024019 A1 Sep. 27, 2001

(30) Foreign Application Priority Data

Mar. 24, 2000 (JP) ........................................ 2000-083433

(51) Int. Cl.⁷ .............................................. F16F 11/00
(52) U.S. Cl. ........................................ 277/593; 277/598
(58) Field of Search .................................. 277/590, 591, 277/592, 593, 594, 595, 596, 597, 598, FOR 246, FOR 248, FOR 249

(56) References Cited

U.S. PATENT DOCUMENTS

| | | | | |
|---|---|---|---|---|
| 3,986,721 A | * | 10/1976 | Decker ........................ | 277/639 |
| 4,204,691 A | * | 5/1980 | Takase et al. ................ | 277/591 |
| 4,535,996 A | * | 8/1985 | Cardis et al. ................ | 277/313 |
| 4,655,463 A | * | 4/1987 | Inciong et al. ............... | 277/593 |
| 5,054,793 A | * | 10/1991 | Hauenstein et al. ........ | 277/313 |
| 5,333,884 A | * | 8/1994 | Miyaoh et al. ............. | 277/598 |
| 5,375,856 A | * | 12/1994 | Ishikawa et al. ............ | 277/591 |
| 5,513,603 A | * | 5/1996 | Ang et al. ................. | 123/198 E |
| 5,536,023 A | * | 7/1996 | Surbrook et al. ........... | 277/593 |
| 5,775,701 A | * | 7/1998 | Martini ....................... | 277/591 |
| 5,979,906 A | * | 11/1999 | Silvian ....................... | 277/593 |

FOREIGN PATENT DOCUMENTS

JP    39868/1993    2/1993

* cited by examiner

*Primary Examiner*—Robert J. Sandy
*Assistant Examiner*—Vishal Patel
(74) *Attorney, Agent, or Firm*—Browdy and Neimark, P.L.L.C.

(57) ABSTRACT

A gasket-squeeze construction wherein a warp-limiter member is installed in a bolt hole in which a fastening bolt fits. The warp-limiter member is made less in an amount of flex than confronting surfaces, between which the gasket is disposed and squeezed by the tightening of the fastening bolt. The warp-limiter member serves to make the sealing stress uniform around a combustion gas hole. The warp-limiter member installed in the bolt hole, because of tougher to flex than the confronting surfaces when tightening the fastening bolt, makes uniform the clamping force of the fastening bolt and the compressive stress created around the associated bolt hole, moreover dispersing uniformly the sealing stress throughout around the combustion gas hole such as a cylinder bore, thereby rendering variation in distortion in the sealing joint less to improve the sealing performance.

2 Claims, 3 Drawing Sheets

GASKET-SQUEEZE CONSTRUCTION

BACKGROUND OF THE INVENTION

1. Field of the Invention

The present invention relates to a construction for squeezing a gasket disposed between confronting surfaces of engine components, for example cylinder heads, cylinder blocks and others by a clamping force that results from the tightening of fastening bolts.

2. Description of the Prior Art

With metal gaskets, multi-layer gaskets are conventionally known in public, which are used placed between engine parts such as cylinder blocks, cylinder heads, and so on of automotive engines. An exemplification of the metal gaskets is disclosed in, for example, Japanese Patent Laid-Open No. 39868/1993.

A prior metal gasket 20 shown in FIGS. 4 and 5 is comprised of a pair of bead sheets 21, 22 of stainless steel overlaid one on the other, each of which is made with beads 23, 24 extending around holes 25 formed in alignment with cylinder bores. The metal gasket 20 is a head gasket designed for multi-cylinder engine, and thus the bead sheets 21, 22 are each provided therein with holes 25 arranged juxtaposed in conformation with cylinder bores in the cylinder block of the engine. The bead sheets 21, 22 are also made with bolt holes 26 through which head bolts extend to clamp together the cylinder head and the cylinder block, and other holes for coolant, oil, and so on.

The bead sheets 21, 22 of the metal gasket 20, as shown in FIG. 5, are made with the beads 23, 24 of full bead type, which are raised above any one face thereof towards each other so as to make line abutment against each other at the beads in a cross section taken on the plane joining the centers of any adjacent holes 25. Moreover, any one dead sheets, or bead sheet 22 has a flange 22 formed by folding back the bead sheet itself at a return defining the associated hole 25 to be overlaid on the major surface of the bead sheet, with extending radially to the extent of not having to interfere with the associated bead 24. Although but leach bead 23, 24 is formed independently of one another at an area between any two adjacent holes 25, it will be appreciated that the adjoining beads 23, 24 may be made to merge into a single bead. Moreover, it is well-known that the modification in width and/or height of the beads 23, 24 and in thickness and/or width of the flanges 27 results in the increase of compressive sealing stress when tightened, at the area between the adjacent holes 25, which extends over an angle a shown in FIG. 4.

When tightening the head bolts to squeeze the metal gasket 20 placed between the confronting surfaces of the engine components, the beads 23, 24 generates, in combination with the flange 27 folded back to serve increasing the sheet thickness, a dual annular sealing construction of high compressive sealing stress around the associated hole 25. The dual annular sealing construction prevents leakage combustion gases through the joint between the mating surfaces of the engine components.

In the meantime the head gasket has areas where the gasket is jointed together with the cylinder head, or bolt holes 26 in which the head bolts are installed to tighten together the cylinder head and the cylinder block. As seen from FIG. 4, the bolt holes 26 are arranged in only the perimetral area of the metal gasket 20 due to spatial design restrictions and further, not all the bolt holes 26 are uniformly disposed around the holes at areas where the sealing effects are need locally. Moreover, the compressive sealing stress desired in the head gasket 20 differs in magnitude between a first sealing stress level needed at areas around the holes 25 and a second sealing stress desired neighboring the coolant holes and oil holes. It will be understood that the first sealing stress is set higher than the second sealing stress.

To keep the compressive sealing stress higher around the cylinder holes in the head gaskets such as multi-layer gaskets, composite gaskets, and so on, various measures in the gasket construction have been taken, in which the metallic sheet is increased in thickness only areas surrounding around the cylinder bores or the beads around the cylinder bores are made greater in height than the beads around the coolant holes, oil holes and others. The desired compressive sealing stress around the cylinder holes is established by the tightening of the head bolts, which are mostly remote from the cylinder holes. Thus, the much tightening of the head bolts is needed to ensure the sufficiently high sealing stress at the areas around the cylinder holes. This becomes a major problem in which continued bolt tightening might cause deformation of the cylinder block and the cylinder head at or near the fastening bolts.

As a result, although the sealing stress becomes high at the areas around the cylinder holes nearby the head bolts tightened, other areas far spaced away from the tightened head bolts, as illustrated with somewhat exaggeration in FIG. 6, might experience deformation in both the cylinder block and the cylinder head, in which the mating surfaces 4, 5 are subjected to warp towards opposite directions, whereby the cylinder block 3 and the cylinder head 2 are made spaced apart away from each other at the region between the adjoining head bolts. This results in failure of ensuring the desired sealing stress around the cylinder holes neighboring the region where the mating surfaces are made spaced away from each other. Even if the head bolts more continue tightening to increase the squeeze-torque for ensuring the desired sealing stress, the satisfactory head-to-block sealing is no longer established at, especially, the area between any two adjacent cylinder holes because the warp occurring between the cylinder head 2 and the cylinder block 3 is much more enlarged, so that it becomes very tough to realize well the desired sealing stress at the sealing areas with good balance.

To cope with the event stated earlier, many modifications are required such that the folded flange of the gasket is further made varied in thickness and/or radial width locally around the associated cylinder hole, the beads are changed in height and/or width, and each metallic sheet itself is varied in thickness. These modifications make the construction of the gasket complicated, thus coming to have a strong tendency to repeat a vicious spiral introducing much trouble in effort and cost on every aspect.

The disadvantageous phenomenon of the vicious relation between the gasket construction and the sealing stress on the sealing areas is apt to become much more remarkable in all aluminum-made engine of open deck type.

The metal gaskets for the current engines are involved inherently with the antinomic subject matter: it is needed to render the spring constant of the bead large to reduce the warp at the mating surfaces by either the use of materials higher in elasticity and/or stiffness or the modification embodied in the gasket construction, while the elastic effect should be regulated such that the sealing stress does not converge on only any local area, but diverges uniformly over the gasket. Nevertheless, the above-mentioned vicious relation between the gasket construction and the sealing stress on the sealing areas is considered a major problem left to solve, compared with the antinomic subject matter described just above.

The problem discussed earlier occurs more or less in other gaskets than the head gaskets, which are adapted disposed between the mating surfaces of the cylinder head and any of the intake and exhaust manifolds.

Thus, it will be worthwhile developing a squeezing construction for a gasket disposed between the confronting surfaces of the engine components such as cylinder head, cylinder block, and so on, in which a clamping force resulting from the tightening of fastening bolts to squeeze together the gasket between the confronting surfaces is made uniform throughout the entire of the gasket while a sealing stress created neighboring bolt holes where the fastening bolts are inserted is made as even as possible to realize the sealing stress uniformed throughout around a combustion hole whereby a warp, otherwise might occur on the mating surfaces to be sealed, is made less and also reduced in variation.

SUMMARY OF THE INVENTION

A primary object of the present invention is to overcome the major-problem stated earlier and in particular provide a squeezing construction for a gasket disposed between confronting surfaces of the engine components such as cylinder head, cylinder block, and so on, which makes it possible to avoid a phenomenon an axial fastening force exerted to a fastening bolt becomes high only at some limited fastening bolts, thereby keeping the axial tightening force down on all fastening bolts to suppress any warp, which might occur in the confronting surfaces. According to the squeezing construction of the present invention, the gaskets are improved in the sealing performance, durability and reliability at the joints of the mating surfaces of the confronting engine components, thus helping improve fuel consumption and purify the exhaust gases.

The present invention is concerned with a squeezing construction for a gasket, in which the gasket is placed between confronting surfaces of engine components made therein with combustion gas holes and arranged in opposition to each other, and squeezed by tightening a fastening bolt to seal a joint between the confronting surfaces of engine components, and wherein a warp-limiter member is installed in a bolt hole formed in the gasket, in which the fastening bolt fits, the warp-limiter member being made tougher to flex than the confronting surfaces of the components, to which the warp-limiter member comes in abutment.

With the gasket-squeeze construction recited earlier, the warp-limiter member fits in the bolt hole, which is made less in an amount of flex or warp than the confronting surfaces of the engine components under the clamping force. As a result, when the gasket is squeezed between the confronting surfaces by the tightening of the fastening bolts fitted in the bolt holes formed in the gasket, the amount of flex arising from the clamping force is not equivalent with only the amount of flex occurring in the engine components mating directly with the gasket, but taken up partially by the thickness of the warp-limiter member, which is high in elasticity and correspondingly less in the amount of flex.

Thus, the clearance between the confronting surfaces of the engine components can be adjusted easily by virtue of the thickness of the warp-limiter member, so that it becomes easy to control the axial fastening force applied to the fastening bolt, which has the great effects on the amount of flex occurring in the engine components. This, consequently, makes it possible to bypass the phenomenon such that the axial fastening force and the corresponding amount of axial flex increases at only some limited fastening bolts. Thus, the warp-limiter member serves to suppress the axial fastening force of the fastening bolt and the amount of flex arising from the axial fastening force as uniformly as possible, thereby rendering variation in distortion in the sealing joint less to improve the sealing performance.

In one aspect of the present invention, an improvement in a squeezing construction for a gasket is disclosed wherein the engine components are a cylinder block and a cylinder head to be jointed with cylinder block, and the gasket is disposed between the confronting surfaces of the cylinder head and the cylinder block.

In another aspect of the present invention, an improvement in a squeezing construction for a gasket is disclosed wherein the engine components are a cylinder head and any one of an intake manifold and an exhaust manifold to be jointed with the cylinder head, and the gasket is disposed between confronting surfaces of the cylinder head and any one of the intake manifold and the exhaust manifold.

In another aspect of the present invention, an improvement in a squeezing construction for a gasket is disclosed wherein the gasket is composed of any one selected from a metallic gasket of one metallic sheet or layered metallic sheets, a resinous gasket of resinous sheet, and a composite gasket of the at least one metallic sheet and the resinous sheet.

In a further another aspect of the present invention, an improvement in a squeezing construction for a gasket is disclosed wherein the warp-limiter members are installed in all the bolt holes, one to each bolt hole.

In another aspect of the present invention, an improvement in a squeezing construction for a gasket is disclosed wherein the warp-limiter member has a thickness that is preselected so as to ensure a desired sealing stress made uniform in the gasket around the combustion gas holes when the fastening bolt is turned through a preselected specified angle where the fastening bolt is tightened to such extent that the final tightening of the fastening bolt reaches a preselected amount or length of tightening.

In a further another aspect of the present invention, an improvement in a squeezing construction for a gasket is disclosed wherein the warp-limiter member is installed in the bolt hole, rather than attached to the gasket. Alternatively, the warp-limiter member may be installed in the bolt hole with attached to the gasket through securing means such as adhesive, welding, engagement, and so on. That is to say, the warp-limiter member may be formed in either an independent part separated absolutely from the gasket or a part integral with the gasket.

In another aspect of the present invention, an improvement in a squeezing construction for a gasket is disclosed wherein the warp-limiter member is made of any one selected from a single hard metal plate, layered metal sheet, sintered metallic substances and composite materials, which is formed in a washer-like shape allowing the fastening bolt to extend through there.

In a further another aspect of the present invention, an improvement in a squeezing construction for a gasket is disclosed wherein the gasket is made therein with a combustion gas hole in alignment with the combustion gas holes in the engine components, and further provided with a bead surrounding around the combustion gas hole.

With the squeezing construction for the gasket as stated earlier, the warp-limiter member is installed in the bolt hole, which is made of a washer, layered metallic plate, and so on rendered less in the amount of flex than the engine components. The warp-limiter member is allowed to vary in thickness as far as the beads and folded flanges may serve their functions. With all the fastening bolts being installed with the warp-limiter members in the bolt holes, the cylinder head and the cylinder block are less subject to distortion when turning each fastening bolt through the specified angle. Thus, the sealing stress at the joints may be made much more uniformed. Moreover, the axial fastening force set according to the lowest sealing stress standard can be also made reduced.

Other aspects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

A squeezing construction for a gasket according to the present invention will be in detail explained below with reference to the accompanying drawings showing preferred embodiments of the present invention.

Figure 1:
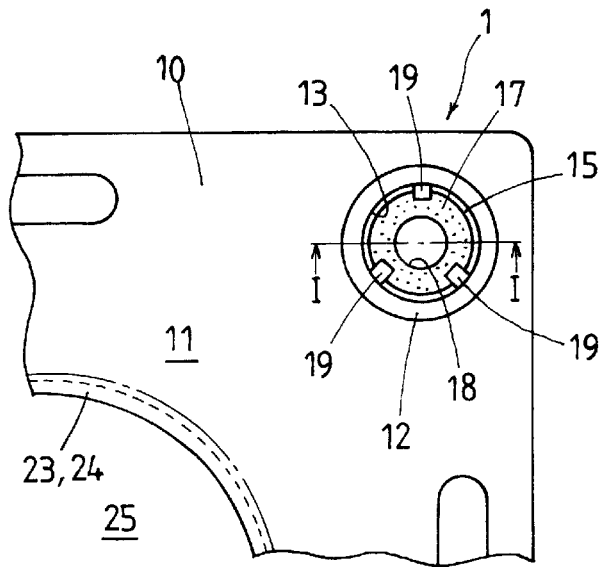
FIG. 1 is a fragmentary plan view showing a preferred embodiment of a squeezing construction for a gasket according to the present invention.
Figure 2:
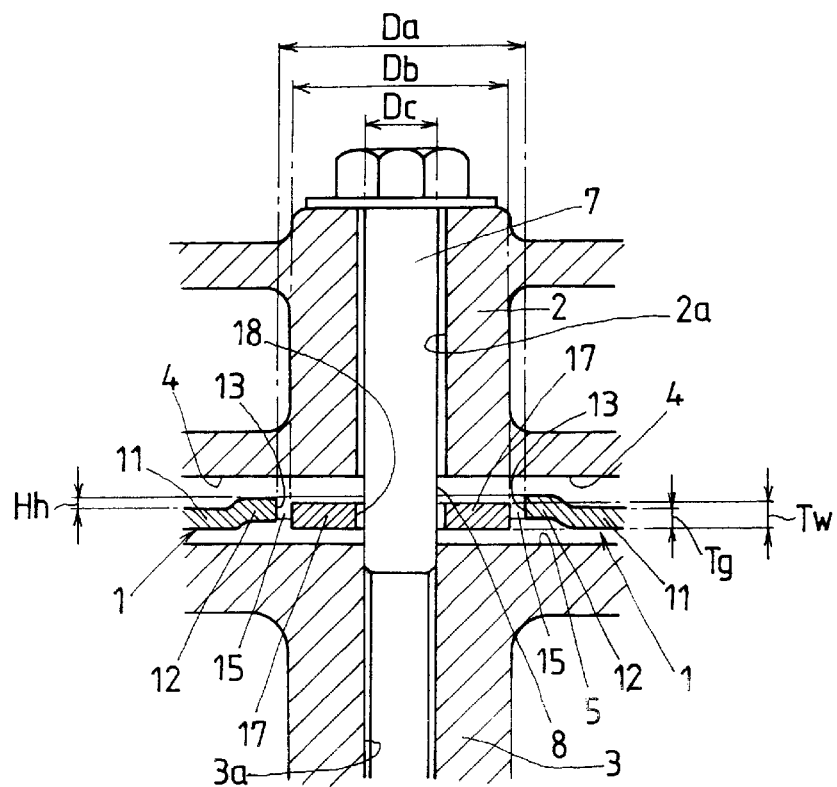
FIG. 2 is a fragmentary sectional view of the squeezing construction taken along the line I—I of FIG. 1.
Figure 5:
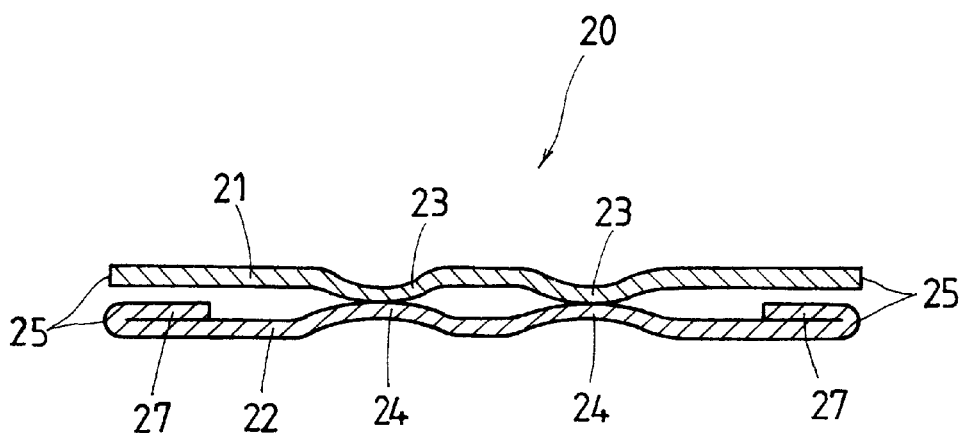
FIG. 5 is a fragmentary sectional view of the metal gasket taken along the line II—II of FIG. 4.

A gasket 1 in FIG. 1 is a head gasket used in a manner shown in FIG. 2, which is disposed under squeezed condition between confronting surfaces 4, 5 of engine components: a cylinder head 2 and a cylinder block 3 to seal the joint between the confronting surfaces 4, 5. The gasket 1 shown in FIG. 1, as with the prior metallic gasket in FIGS. 5 and 6, may be made metallic sheets overlaid one on the other, and designed for multi-cylinder engines such as four- or six-cylinder engines. The gasket 1, except a construction at an area around a bolt hole in which a tightening bolt fits, is principally identical in construction with the gasket 20 stated earlier. To that extent, like components have been given the same reference characters, so that the previous description will be applicable.

A metallic sheet 10 of the gasket 1 is provided therein with holes 25 arranged juxtaposed in alignment cylinder bores in the cylinder block 3. Moreover, the metallic sheet 10 is made with bolt holes 15 in which fastening bolts 7 fit to keep in place both the cylinder head 2 and the cylinder block 3 and squeeze the gasket 1 between the confronting cylinder head 2 and cylinder block 3. Although the metallic sheet 10 is also made with other various holes such as coolant holes, oil holes knock holes, and so on, these holes are well known to those skilled in the art, and thus the detailed description thereof will be omitted herein.

FIG. 1 shows in plan view a bolt hole 15 and a nearby area around the bolt hole 15, while FIG. 2 is a section taken on a plane I—I of FIG. 1. The gasket 1, as seen in section of FIG. 2, is raised around the bolt hole 15 above any one surface of a major sheet area 11 of the gasket 1 to form a half bead 12, which has an inside end defining a perimetral edge 13 encircling the bolt hole 15.

The bolt hole 15 is made in an opening diameter Da larger than a bolt diameter Dc of the fastening bolt 7 to provide an annular space between the perimetral edge 13 of the bolt hole 15 and an outside periphery of the fastening bolt 7. Arranged in the annular space is a warp-limiter member 17 stated later. The warp-limiter member 17 as a whole is formed in an annular shape, in which an inside periphery 18 of the warp-limiter member 17 is determined to have a diameter substantially equal with the bolt diameter Dc of the fastening bolt 7 to the extent allowing the fastening bolt 7 to pass through there.

The warp-limiter member 17 is also made in an outside diameter Db somewhat smaller than the opening diameter Da of the bolt hole 15 to isolate the warp-limiter member 17 from the perimetral edge 13 of the half bead 12 with a small clearance between them. For previously uniting the warp-limiter member 17 with the gasket 1, an appropriate adhesive such as resins and so on is charged into an annular clearance between the warp-limiter member 17 and the perimetral edge 13 of the gasket 1. Alternatively, the warp-limiter member 17 may be anchored with adhesion means such as welding, riveting, adhesive, and so on through at least three fingers 19, as shown in FIG. 1, which are arranged circumferentially along the perimetral edge 13 of the gasket 1.

The warp-limiter member 17 is made of, but is not limited to, for example a stainless steel plate made in a washer or a clad metal plate, which is less subject to warp than the engine components such as the cylinder head 2 and cylinder block 3. The warp-limiter member 17 is set tougher to flex under the same stress than the confronting surfaces of the cylinder head 2 and the cylinder block 3. The warp-limiter members 17 are disposed in all the bolt holes 15, one to each bolt hole.

Figure 4:
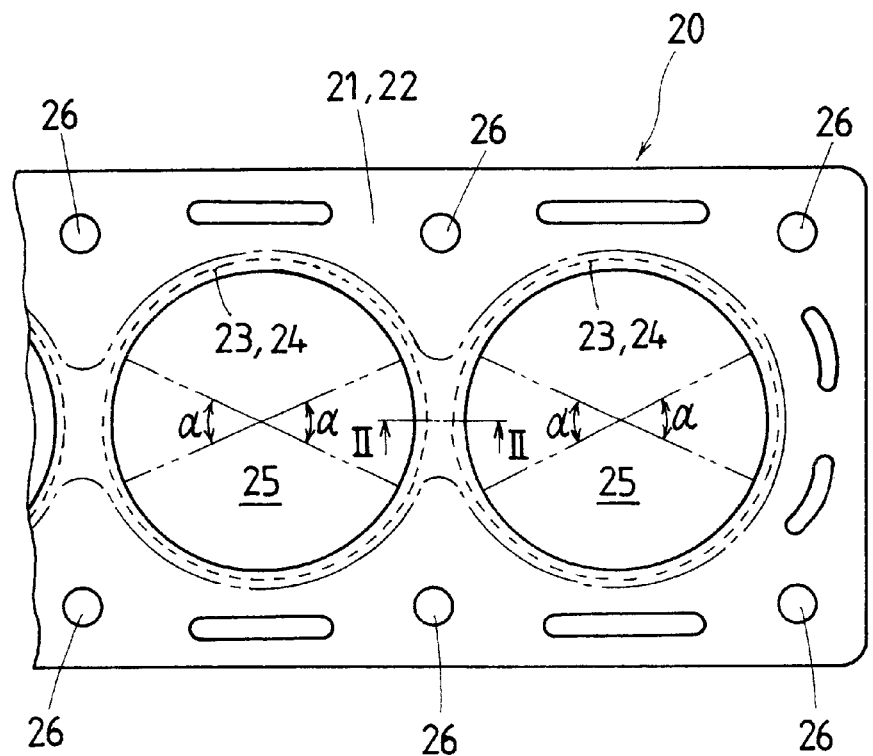
FIG. 4 is a plan view, partially cut away, showing a metal gasket of the prior art.

The warp-limiter member 17, although larger in thickness Tw than the gasket 1 of thickness Tg, is preferably set a thickness thinner than a sum of the thickness Tg of the gasket 1 and a bead height Hh of the half bead 12 lest the warp-limiter member 17 comes into an obstacle to the bead effect of the half bead 12 When squeezed. The sealing effect at the beads 23, 24 formed around the holes 25 is not possible when using the warp-limiter member 17 excessive in the thickness Tw. Thus, the thickness Tw of the warp-limiter member 17 has to be determined, depending on previous findings about how best to serve the sealing performance of the beads 23, 24 and the folded flange 25, shown in FIG. 5, and also compression stopper and sealing functions of the thickened area spanning over the angle α in FIG. 4, with keeping the sealing areas at the desired sealing stress when tightening each bolt in proper sequence through a specified angle to a specified torque as stated later, that is to say, when tightening each bolt to such extent that the final tightening of the fastening bolt reaches a preselected amount or length of tightening.

On head gasket installation, the gasket 1 is first disposed between the confronting surfaces of the cylinder head 2 and the cylinder block 3. The fastening bolt 7, after extending through a hole 2a in the cylinder head 2 and the warp-limiter member 17 installed in the bolt hole 15 in the gasket 1, is screwed into a threaded hole 3A in the cylinder block 3 to thereby squeeze together the gasket between the cylinder head 2 and the cylinder block 3. In the event stated above, the warp-limiter member 17 is subject to compressive deformation due to the elasticity in itself while the half bead 12 is pressed together with the confronting surfaces 3, 5 of the cylinder head 2 and the cylinder block 3 to be collapsed around the bolt hole 15, so that the sealing stress rises around the bolt hole 15. The clamping force that results from the tightening of the fastening bolt 7 reaches the areas neighboring the holes 25 in the gasket 1 to deform the beads 23, 24 formed around the holes 25, thereby realizing annular sealing zones of highly compressive resealing stress. This prevents leakage of high-temperature, high-pressure combustion gases from the joint between the cylinder head 2 and the cylinder block 3 around the holes 25.

With the squeezing construction for gaskets constructed as stated earlier, the warp-limiter member 17 is made of the washer or clad metal plate, which is tougher to warp than the engine components such as the cylinder head 2 and cylinder block 3. Accordingly, the warp-limiter member 17 is less subject to flex than the confronting surfaces of the cylinder head 2 and the cylinder block 3 when the gasket 1 is squeezed between the mating surfaces 4, 5 of the confronting cylinder head 2 and the cylinder block 3.

This proves that the warp-limiter member 17 serves to reduce the distortion occurring in the cylinder head 2 and the cylinder block 3, making it possible to uniformly disperse the sealing stress, especially, throughout around the associated hole 25. As the warp-limiter members 17 are installed in all the bolt holes 15, one to each bolt hole, the even uniformity in the sealing stress can be realized at all areas neighboring the bolt holes 25 in the gasket 1. After the gasket 1 has been installed in the situation as stated just above, the fastening bolts 7 are turned in a proper sequence through a specified angle to the specified final torque, or threshold torque where the fastening bolt is tightened to such that the final tightening of the fastening bolt reaches a preselected amount or length of tightening. As the fastening torque exerted on the fastening bolt 7 is limited uniformly to the lowest desired force to create the sealing stress in every fastening bolt 7, there is no fear of such troublesome condition that the clamping force resulting from only some limited fastening bolts 7 becomes either too much or too little. Moreover, the axial fastening force set according to the lowest sealing stress standard can be also made reduced.

Figure 3:
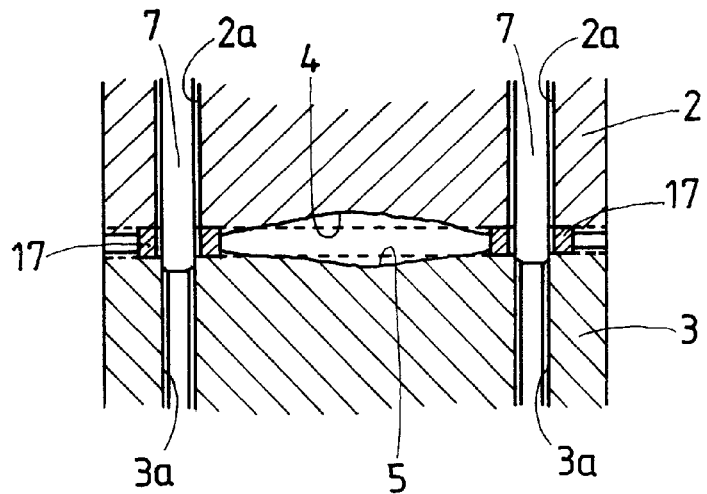
FIG. 3 is an enlarged schematic view illustrating about how the confronting surfaces warp when the gasket is tightened by turning fastening bolts through the specified angle in the squeezing construction of the present invention.
Figure 6:
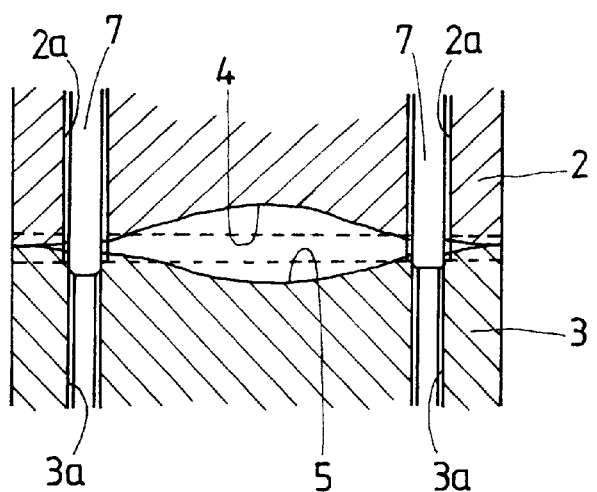
FIG. 6 is an enlarged schematic view illustrating about how the confronting surfaces warp when the gasket is tightened with the prior squeezing technique.

FIG. 3 shows schematically the confronting surfaces 4, 5 of the cylinder head 2 and the cylinder block 3, which are tightened to the specified final torque by turning the fastening bolts through the specified angle in the squeezing construction for the gaskets according to the present invention. As will be understood from comparison with FIG. 6 showing the prior art, the amount of distortion of the confronting surfaces 4, 5 of the cylinder head 2 and the cylinder block 3 at the area spanning between the two adjacent fastening bolts 7 in FIG. 3 can be suppressed to less than or equal to a half as much as the amount of distortion of the confronting surfaces 4, 5 in FIG. 6 by virtue of the warp-limiter member 17 employed in the squeezing construction for gaskets according to the present invention.

Having described specific embodiments of the squeezing construction for gaskets of the present invention, it is believed obvious that the invention is not limited to the embodiments stated earlier. It will be further obvious to those skilled in the art that the squeezing construction of the present invention is not limited to use in the head gaskets: it may of course be applied with equal utility to any gasket with no limitation as to how the gasket is applied, kinds, materials, constitutions and constructions, for example to the gasket used installed between the cylinder head and the intake and exhaust system such as the intake or exhaust manifolds. Moreover, the warp-limiter member, aside from characterized by the amount of flex, is not limited in shape to washer type, and also may be made of any selected from a single hard metal plate, layered metal sheet, composite materials, sintered metallic substances. The warp-limiter member is allowed to vary in thickness as far as the gasket serves the sealing performance of the beads, and also the compression stopper and sealing functions of the thickened area, with keeping the sealing areas at the desired sealing stress. In addition, the warp-limiter member may be either formed in a part separated completely from the gasket or united previously with the gasket.

What is claimed is:

1. In a squeezing construction for a gasket, in which the gasket is placed between confronting surfaces of engine components made therein with combustion gas holes and arranged in opposition to each other, and squeezed by tightening a fastening bolt to seal a joint between the confronting surfaces of engine components, the improvement wherein a warp-limiter member of washer shape is situated in every bolt hole made in the gasket, in which the fastening bolt fits to extend through the warp-limiter member at center thereof, a half bead is formed around every bolt hole in the gasket, the half bead has a radially inside periphery that is radially in line with an inside periphery of the bolt hole, the warp-limiter member has an outer diameter smaller than a size across the bolt hole to leave a clearance between the inside peripheries of the half bead and the bolt hole, so that the warp-limiter member is completely isolated from the gasket, and wherein the warp-limiter member is made in a thickness larger than a thickness of the gasket, but smaller than a sum of the thickness of the gasket and a height of the half bead, so that an amount of variation in a spacing between the confronting surfaces when the gasket is squeezed by tightening the fastening bolt is kept not more than half the amount of variation deviation that might occur when no warp-limiter member is used.

2. An improvement as recited in claim 1, wherein the gasket is composed of any one of single sheet and laminated product of more than one sheet.

\* \* \* \* \*